(12) United States Patent
Eddy et al.

(10) Patent No.: US 7,037,617 B2
(45) Date of Patent: May 2, 2006

(54) CONDUCTIVE COATINGS FOR PEM FUEL CELL ELECTRODES

(75) Inventors: David S. Eddy, Washington, MI (US); Joseph V. Mantese, Shelby Township, MI (US); Charles D. Oakley, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 306 days.

(21) Appl. No.: 10/224,871

(22) Filed: Aug. 21, 2002

(65) Prior Publication Data

US 2004/0038111 A1    Feb. 26, 2004

(51) Int. Cl.
*H01M 2/00*    (2006.01)
(52) U.S. Cl. .............................. 429/34; 429/32; 429/35; 429/38; 427/115
(58) Field of Classification Search ................. 429/34, 429/32, 35, 38; 427/115
See application file for complete search history.

(56) References Cited

U.S. PATENT DOCUMENTS

| | | | |
|---|---|---|---|
| 5,942,349 A * | 8/1999 | Badwal et al. ................ 429/34 |
| 6,280,868 B1 * | 8/2001 | Badwal et al. ................ 429/34 |
| 6,321,145 B1 | 11/2001 | Rajashekara | |
| 6,423,896 B1 | 7/2002 | Keegan | |
| 6,455,185 B1 | 9/2002 | Bircann et al. | |
| 6,485,852 B1 | 11/2002 | Miller et al. | |
| 6,509,113 B1 | 1/2003 | Keegan | |
| 6,551,734 B1 | 4/2003 | Simpkins et al. | |
| 6,562,496 B1 | 5/2003 | Faville et al. | |
| 6,608,463 B1 | 8/2003 | Kelly et al. | |
| 6,613,468 B1 | 9/2003 | Simpkins et al. | |
| 6,613,469 B1 | 9/2003 | Keegan | |
| 6,620,541 B1 * | 9/2003 | Fleck et al. ................... 429/34 |
| 6,627,339 B1 | 9/2003 | Haltiner, Jr. | |
| 6,630,264 B1 | 10/2003 | Haltiner, Jr. et al. | |
| 6,805,989 B1 * | 10/2004 | Seido et al. .................. 429/34 |
| 6,843,960 B1 * | 1/2005 | Krumpelt et al. .............. 419/6 |

* cited by examiner

*Primary Examiner*—Laura Weiner
(74) *Attorney, Agent, or Firm*—Paul L. Marshall

(57) ABSTRACT

Electrical contact surfaces of a bipolar plate for a fuel cell assembly are formed of metals or metal alloys which when oxidized form highly conductive oxide passivation layers, thus maintaining high electrical conductivity and continuity through the fuel cell and forestalling corrosion failure of a cell assembly. Alloy composition systems such as, but not limited to, Ti—Nb, Ti—Ta, La—Sr—Cr, and La—Sr—Co are known to form oxide passivation layers which are highly conductive. The passivation layers may be formed in situ after assembly of a fuel cell or may be provided in an oxidative step during manufacture. The bipolar plate may be formed entirely of one or more of such alloys or may be formed of an inexpensive substrate metal having the alloy layers coated thereupon.

4 Claims, 1 Drawing Sheet

CONDUCTIVE COATINGS FOR PEM FUEL CELL ELECTRODES

TECHNICAL FIELD

The present invention relates to fuel cells; more particularly, to fuel cells having bipolar plate electrodes which separate the individual modules of the fuel cell stack; and most particularly, to means for increasing the reliability and durability of the electrical contact surface of a bipolar plate electrode.

BACKGROUND OF THE INVENTION

Fuel cell assemblies employing a plurality of individual fuel cell modules are well known. Each module has an anode and a cathode. In a proton-exchange fuel cell, the anode and cathode are separated by a catalytic proton exchange membrane (PEM) in which the modules in the stack typically are connected in series electrically through bipolar plates to provide a desired total output voltage. Fuel in the form of hydrogen and water vapor, or hydrogen-containing mixtures such as "reformed" hydrocarbons, is flowed through a first set of reaction channels formed in a first surface of the bipolar plate adjacent the anode. Oxygen, typically in the form of air, is flowed through a second set of reaction channels formed in a second surface of the bipolar plate adjacent the cathode.

In a PEM fuel cell, hydrogen is catalytically oxidized at the anode-membrane interface. The resulting proton, $H^+$, migrates through the membrane to the cathode-membrane interface where it combines with ionic oxygen to form water. Electrons flow from the anode through a load to the cathode, doing electrical work in the load.

In fuel cells, a long-term electrical continuity problem is well known in the art. Metals typically used to form bipolar plates, for example, aluminum a stainless steel, either corrode or form high-resistance oxide passivation layers on the surface of the bipolar plates because of electrochemical activity at these surfaces. These high resistant oxide layers limit the current-collecting ability of the bipolar plates, significantly lower the efficiency and output of a fuel cell. In the prior art, bipolar plates are known to be coated with noble metals such as gold and platinum to prevent corrosion and the formation of high resistant passivation layers on the electrical contact surfaces, but such coatings are so expensive as to impact the widespread use of cost-effective fuel cells.

What is needed is a simple and cost-effective means for maintaining high electrical conductivity of the electrical-contact surfaces of a bipolar plate.

It is a principal object of the present invention to provide an improved bipolar plate which is simple and inexpensive to manufacture and which maintains high electrical conductivity of the surface during use in a fuel cell.

It is a further object of the invention to increase the durability and reliability of a fuel cell.

SUMMARY OF THE INVENTION

Briefly described, electrical contact surfaces of a bipolar plate, as disclosed in this invention, are formed of inexpensive metals which when oxidized form highly conductive surface oxide passivation layers, thus maintaining high electrical conductivity and continuity through the bipolar plates of a fuel cell. Alloy composition systems such as, but not limited to, Ti—Nb, Ti—Ta, La—Sr—Cr, and La—Sr—Co are known to form oxide passivation layers which are highly conductive. The passivation layers may be formed in situ after assembly of a fuel cell or may be provided in an oxidative step during manufacture prior to assembly. The bipolar plate may be formed entirely of one or more of such alloys or may be formed of an inexpensive substrate metal having the alloys coated thereupon.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
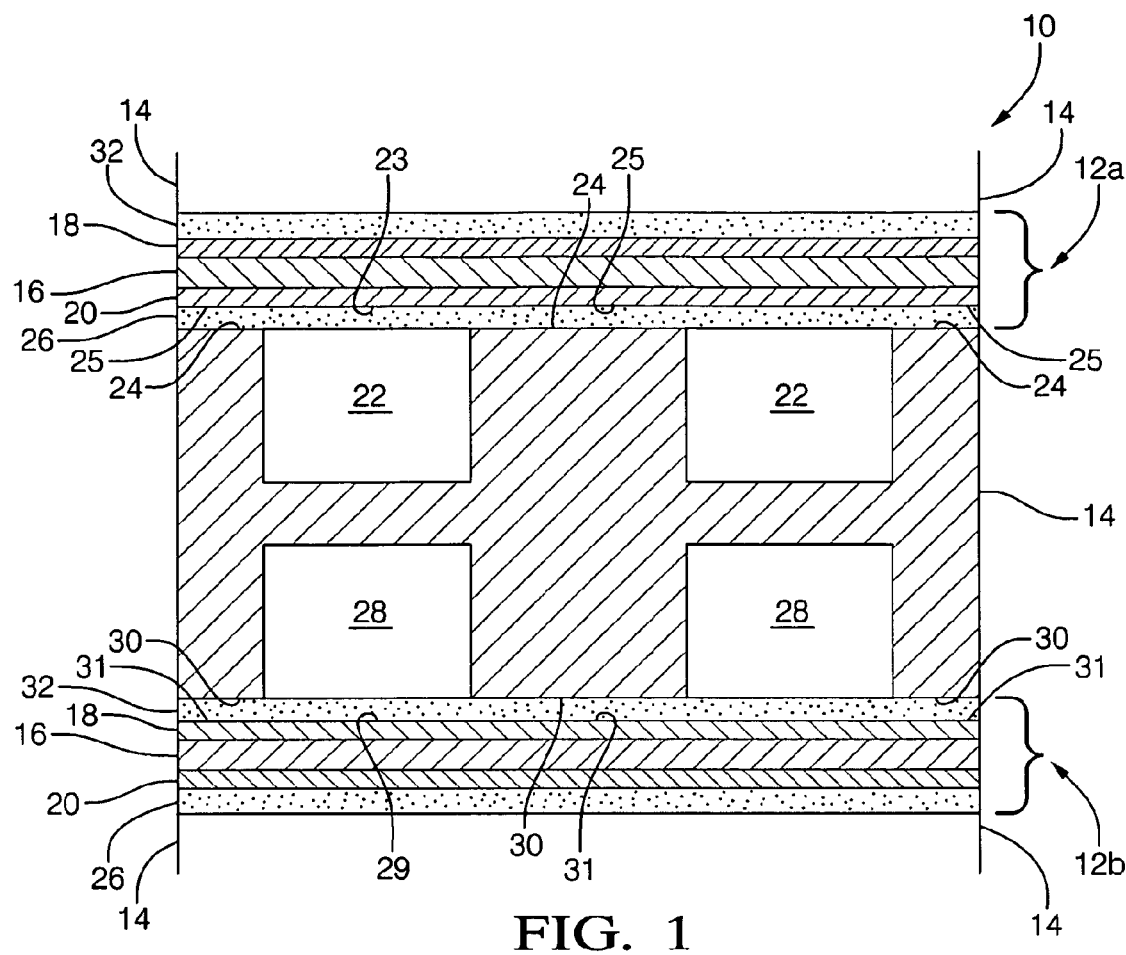
FIG. 1 is a schematic cross-sectional view of a portion of a PEM fuel cell stack showing the relationship of bipolar plates formed in accordance with the invention to the anodes and cathodes thereof.

Referring to FIG. 1, a portion 10 of a multiple-cell PEM fuel cell stack includes a first fuel cell unit 12a and a second fuel cell unit 12b, separated and mechanically/electrically connected by a bipolar plate 14. Each fuel cell 12a, 12b comprises a proton exchange membrane 16 separating an anode 18 and a cathode 20 in known fashion. A complete fuel cell stack (not shown) comprises a plurality of fuel cells 12 similarly separated and connected by a plurality of bipolar plates 14.

Each bipolar plate 14 is provided with a first set of channels 22 for providing oxygen, typically in the form of air, to the cathode surface 23. Channels 22 are separated by first lands 24 for making mechanical and electrical contact with cathode 20. Optionally, a conductive cathode diffuser 26 may be provided between cathode 20 and bipolar plate 14 to permit air to diffuse laterally and thereby reach those portions 25 of the cathode surface 23 covered by first lands 24.

Each bipolar plate 14 is provided with a second set of channels 28 for providing hydrogen fuel to the anode surface 29. Channels 28 are separated by second lands 30 for making mechanical and electrical contact with anode 18. Optionally, a conductive anode diffuser 32 may be provided between anode 18 and bipolar plate 14 to permit fuel to diffuse laterally and thereby reach those portions 31 of the anode surface 29 covered by second lands 30.

It should be understood that in an actual bipolar plate, air and fuel channels 22 and 28 may be oriented orthogonally of each other.

Figure 2:
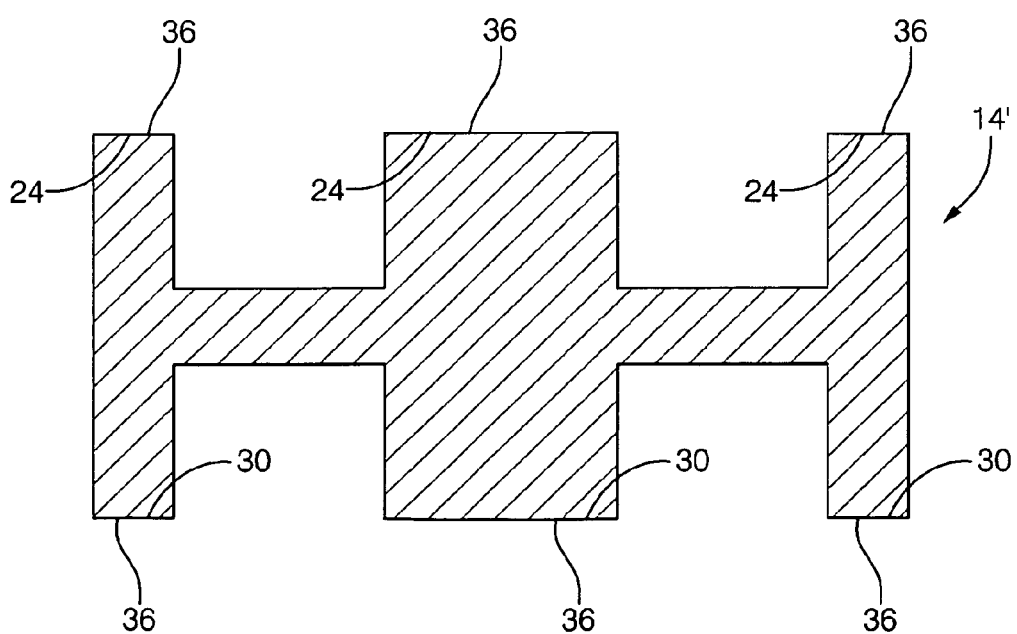
FIG. 2 is a schematic cross-sectional view of a bipolar plate in accordance with the invention.

Referring to FIG. 2, surface portions of lands 24,30 of improved bipolar plate 14' include pure metals, metal alloys, or metallic compounds which may be oxidized to form surface passivation oxide layers having high electrical conductivity, defined by a surface resistivity less than about 0.007 ohms-$cm^2$ and preferably less than about 0.0035 ohms-$cm^2$ or less. By contrast, the comparable surface resistivity of surface-oxidized pure titanium is about 0.035 ohm-$cm^2$. Thus, oxide passivation layers formed in accordance with the invention provide a conductivity improvement on the order of about ten-fold or greater. Examples of suitable metals and alloy systems include, but are not limited to, Ti—Nb, Ti—Ta, La—Sr—Cr, and La—Sr—Co. Those skilled in the art of metal chemistry may recognize other suitable metals or metal combinations which may form conductive oxide passivation layers within the scope of the invention.

In a currently preferred embodiment, contact surfaces of lands 24,30 of a bipolar plate substrate 14' (formed of preferably aluminum or stainless steel) comprise a thin outer layer 36 of an alloy comprising between about 0 and about 3 atomic percent Nb or Ta and between about 97 and about 100 atomic percent Ti; most preferably, 1.5 atomic percent Nb or Ta and 98.5 atomic percent Ti. Such a layer is readily formed by any of several known methods, for example, by magnetron sputtering of Ti, Nb and Ta targets onto substrate 34, and can form an oxide layer having a surface resistivity of about 0.0035 ohms-cm$^2$.

Preferably, layer 36 is subsequently treated thermally, chemically, and/or electrochemically in known fashion during manufacture of bipolar plate 14 to cause a portion of the metallic constituents of layer 36 to be converted to metal-like electrically-conductive oxides, for example, $Ti^{+3}_x Ti^{+4}_{(1-x)} Nb^{+5}_x O_2$ or $Ti^{+3}_x Ti^{+4}_{(1-x)} Ta^{+5}_x O_2$ where x represents the atomic fraction of Nb or Ta metal based, typically but not limited to the range of $0.0 \leq x \leq 0.03$. Alternatively, bipolar plate 14' containing layer 36 may be assembled into a fuel cell stack and layer 36 may be allowed to oxidize spontaneously by exposure to atmospheric oxygen and electrical current during operation of the fuel cell.

In a second embodiment in accordance with the invention, most or all of bipolar plate 14' is formed of metal material as recited hereinabove, the surfaces thereof then being oxidized to form layers 36. This embodiment is currently not preferred because it is wasteful of those materials, only a thin surface coating thereof being required for satisfactory performance of a bipolar plate.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A bipolar plate for use in a fuel cell stack, comprising at least one surface exposing metallic material oxidizable to form a metal oxide, wherein said metallic material is selected from the group consisting of Ti—Nb, Ti—Ta, and combinations thereof, wherein said oxide is of the formula selected from the group consisting of $Ti^{+3}_x Ti^{+4}_{(1-x)} Nb^{+5}_x O_2$ and $Ti^{+3}_x Ti^{+4}_{(1-x)} Ta^{+5}_x O_2$ where x represents the atomic fraction of Nb or Ta metal based in the range of $0.0 \leq x \leq 0.03$.

2. A bipolar plate for use in a fuel cell stack, comprising at least one surface exposing metallic material oxidizable to form a metal oxide, wherein said metallic material is selected from the group consisting of Ti—Nb, Ti—Ta, and combinations thereof.

3. A bipolar plate in accordance with claim 2 wherein said oxide is of the formula selected from the group consisting of $Ti^{+3}_x Ti^{+4}_{(1-x)} Nb^{+5}_x O_2$ and $Ti^{+3}_x Ti^{+4}_{(1-x)} Ta^{+5}_x O_2$ where x represents the atomic fraction of Nb or Ta metal based in the range of $0.0 \leq x \leq 0.03$.

4. A method for forming a bipolar plate for use in a fuel cell assembly, comprising the steps of:
   a) forming a substrate blank of said bipolar plate from a conductive metal;
   b) depositing an exposed layer on at least one surface of said blank, said layer comprising metallic material oxidizable to form a metal oxide passivation layer, wherein said metallic material is selected from the group consisting of Ti—Nb, Ti—Ta, La—Sr—Cr, La—Sr—Co, and combinations thereof; and
   c) oxidizing at least a portion of said metallic material to form said metal oxide passivation layer.

* * * * *